US012651117B2

(12) United States Patent
Choi et al.

(10) Patent No.: US 12,651,117 B2
(45) Date of Patent: Jun. 9, 2026

(54) METHODS AND SYSTEMS FOR VERIFICATION OF PLANT PROCEDURES' COMPLIANCE TO WRITING MANUALS

(71) Applicant: INJE UNIVERSITY INDUSTRY-ACADEMIC COOPERATION FOUNDATION, Gimhae-si (KR)

(72) Inventors: Yongsun Choi, Yeonje-gu (KR); Minh Duc Nguyen, Gimhae-si (KR)

(73) Assignee: INJE UNIVERSITY INDUSTRY-ACADEMIC COOPERATION FOUNDATION, Gimhae-si (KR)

( * ) Notice: Subject to any disclaimer, the term of this patent is extended or adjusted under 35 U.S.C. 154(b) by 968 days.

(21) Appl. No.: 17/777,532

(22) PCT Filed: Feb. 19, 2021

(86) PCT No.: PCT/KR2021/002158
§ 371 (c)(1),
(2) Date: May 17, 2022

(87) PCT Pub. No.: WO2022/071637
PCT Pub. Date: Apr. 7, 2022

(65) Prior Publication Data
US 2024/0028826 A1 Jan. 25, 2024

(30) Foreign Application Priority Data

Sep. 29, 2020 (KR) ........................ 10-2020-0127076
Feb. 8, 2021 (KR) ........................ 10-2021-0017744

(51) Int. Cl.
*G06F 40/253* (2020.01)
*G06F 16/35* (2025.01)
(Continued)

(52) U.S. Cl.
CPC ............ *G06F 40/253* (2020.01); *G06F 16/35* (2019.01); *G06F 40/211* (2020.01);
(Continued)

(58) Field of Classification Search
CPC ...... G06F 40/253; G06F 16/35; G06F 40/284; G06F 40/211; G06F 40/30; G06Q 10/0633
See application file for complete search history.

(56) References Cited

U.S. PATENT DOCUMENTS

2018/0068181 A1* 3/2018 Coleman ................ G06V 30/40
2018/0157642 A1* 6/2018 Matskevich .......... G06F 40/211

FOREIGN PATENT DOCUMENTS

JP 2015-118485 A 6/2015
JP 2017049639 * 3/2017
(Continued)

OTHER PUBLICATIONS

"PPA AP-907-001 Procedure Process Description", Procedure Professionals Association (Year: 2016).*
(Continued)

*Primary Examiner* — Richemond Dorvil
*Assistant Examiner* — Adam Michael Weaver
(74) *Attorney, Agent, or Firm* — WOMBLE BOND DICKINSON (US) LLP

(57) ABSTRACT

The present invention provides methods and systems for the verification of industrial plant procedures on their compliance to writing manuals. Specific guidelines described in a procedure writing manual are aimed to improve human performance quality of plant personnel. The present invention extracts all significant syntactic and semantic information from procedure documents and verifies each sentence (or phrase) in procedures whether it conforms to all guidelines of the regulated procedure writing manual, utilizing the
(Continued)

extracted information. Therefore, the present invention provides procedures free from human error traps to fundamentally prevent an incident incurred from a human error, for the safe and efficient operation of industrial plants.

19 Claims, 5 Drawing Sheets

(51) Int. Cl.

| | |
|---|---|
| ***G06F 40/211*** | (2020.01) |
| ***G06F 40/284*** | (2020.01) |
| ***G06F 40/30*** | (2020.01) |
| ***G06Q 10/0633*** | (2023.01) |

(52) U.S. Cl.
CPC ............ *G06F 40/284* (2020.01); *G06F 40/30* (2020.01); *G06Q 10/0633* (2013.01)

(56) References Cited

FOREIGN PATENT DOCUMENTS

| | | | | | |
|---|---|---|---|---|---|
| JP | 2017049639 | A | * | 3/2017 | |
| JP | 2018-206171 | A | | 12/2018 | |
| JP | 2019028937 | | * | 2/2019 | |
| JP | 2019028937 | A | * | 2/2019 | |
| KR | 10-1557261 | B1 | | 10/2015 | |
| KR | 10-1917038 | B1 | | 1/2019 | |
| KR | 10-2020-0001936 | A | | 1/2020 | |
| KR | 20200001936 | A | * | 1/2020 | ......... G06F 17/2745 |
| KR | 20200001936 | | * | 2/2020 | |

OTHER PUBLICATIONS

Choi et al., “Syntactic and semantic information extraction from NPP procedures utilizing natural language processing integrated with rules”, Nuclear Engineering and Technology, vol. 53, 2021, pp. 866-878.
International Search Report received for PCT Patent Application No. PCT/KR2021/002158, mailed on Jun. 28, 2021, 7 pages (3 pages of English Translation and 4 pages of Original Document).
Office Action received for Korean Patent Application No. 10-2021-0017744, mailed on Nov. 29, 2022, 17 pages (9 pages of English Translation and 8 pages of Original Document).
Procedure Professionals Association, “Procedure Process Description”, PPA AP-907-001, Revision 2, Jan. 2016, 31 pages.

* cited by examiner

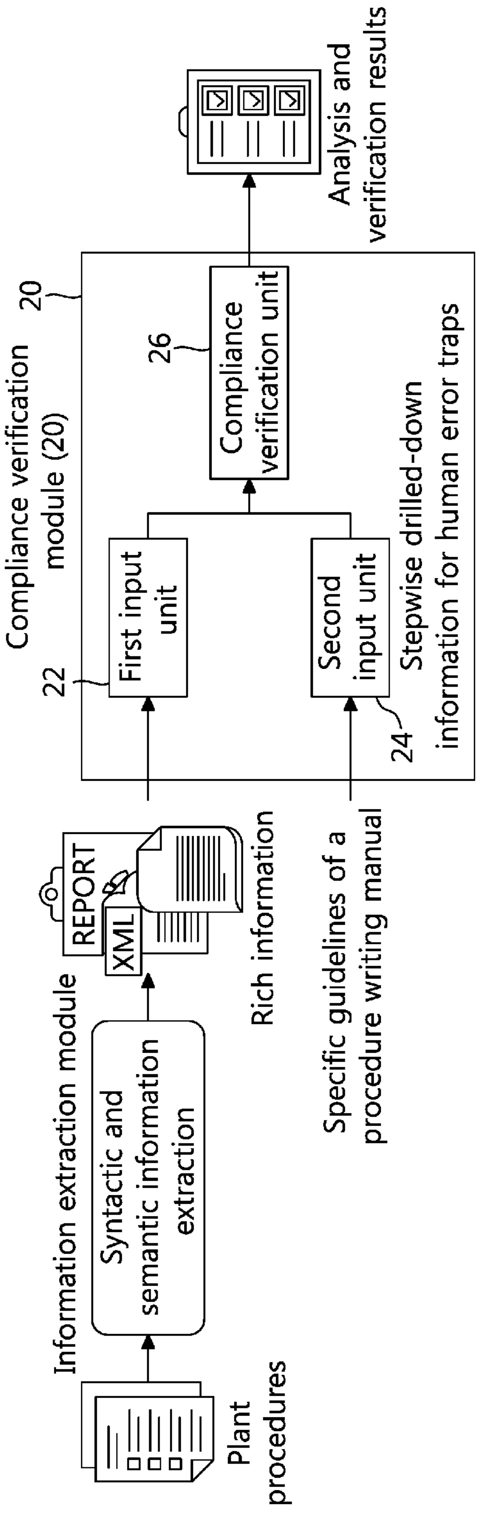

FIG. 1

Plant procedures

Information extraction module

Syntactic and semantic information extraction

Rich information

REPORT
XML

Specific guidelines of a procedure writing manual

Compliance verification module (20)

20

22

First input unit

Second input unit

24

Stepwise drilled-down information for human error traps

26

Compliance verification unit

Analysis and verification results

100

120

METHODS AND SYSTEMS FOR VERIFICATION OF PLANT PROCEDURES' COMPLIANCE TO WRITING MANUALS

TECHNICAL FIELD

The present invention relates to the development and maintenance of procedures that are critical for the safe and efficient operation of an industrial plant equipped with many facilities, such as a nuclear power plant (NPP). More specifically, the present invention relates to methods and systems for verification of plant procedures' compliance to writing manuals that emphasize exclusion of human error traps. All significant syntactic and semantic information are extracted from procedures, and then each sentence (or phrase) in procedures is verified whether it conforms to all specific guidelines described in a procedure writing manual utilizing the extracted information.

BACKGROUND ART

A plant described in the present specification refers to an industrial plant operating many facilities, such as a power plant, an oil refinery, a (petro) chemical plant, a desalination plant, etc. The embodiments that are described below have been exemplified with NPP procedures. However, it is apparent that the present invention could be also applied to procedures of other types of industrial plants.

Procedures play a key role in ensuring safe, deliberate, and controlled operation of a plant equipped with a lot of facilities, such as an NPP, by broadly supporting all the activities of its personnel. They also play an intermediary role in the transfer of knowledge, regarding the design requirements and actual implementation of a plant, from system engineers to the operators of the plant. They even play important roles for training the personnel of a plant. Furthermore, procedures support the plant managers' understanding of how exactly to meet the standards and expectations for the operation and maintenance of the plant.

Thus, procedures are desired be accurate in technical and operational aspects integrating the up-to-date knowledge available in all relevant areas which include the requirements, policies, physical facilities, processes, and people involved to operate the plant safely. In addition, the controlled documents of procedures must be easy to follow to ensure human performance quality by clearly providing the purpose, specific intent, and sequenced directions for each activity, program, or process.

Investigation reports of major accidents, published by domestic or foreign agencies, have revealed that inadequate management of procedures is one of the main contributing factors to incidents in a plant. Therefore, each plant has a responsibility to develop and maintain sound procedures reflecting both aspects of the latest relevant technologies and the human factors engineering. Additionally, each plant is also responsible for its personnel to perform all activities in accordance with the procedures.

A large volume of interrelated procedures of various types are desired for a plant, depending on its scale and process complexity. Additionally, revisions of procedures are unceasingly demanded by various occasions. A large number of people are involved in the development and maintenance of technical procedures for diverse NPP components. Their technical backgrounds and work experiences with specific components are diverse, and their understandings of the procedure writing guidelines that are aimed on the enhancement of human performance quality are not necessarily the same.

Accordingly, it is a very difficult task for those many people of different backgrounds to develop and maintain sound procedures reflecting all the aforementioned requirements in coherent manner. In general, engineering experts focus on technical aspects, including outstanding issues and applicable operating experiences. A limited number of expert procedure writers review the procedures on their compliance to the regulated writing manual. A procedure writing manual, whether a broadly approved one of the Procedure Professionals Association (PPA) or a plant-specific developed one, describes the principles and practices for procedure writing to ensure human performance quality. However, it is not an easy task even for expert procedure writers to apply various writing guidelines required to ensure human performance quality to a large volume of procedures in consistent manner.

Therefore, a solution is desired to optimize the process of developing and maintaining procedures that are compliant to various writing guidelines required to ensure human performance quality. More specifically, an efficient and effective solution is desired to identify any human error traps unwittingly embedded in procedure writings, as a base technology for advanced management of procedures.

DISCLOSURE

Technical Problem

A purpose of the present invention is to extract precisely all significant syntactic and sematic information from input procedure documents.

Another purpose of the present invention is to supplement or to verify the integrity of plant configuration data set that is separately managed in various forms, including an engineering database, utilizing relevant semantic elements extracted from procedure documents.

Another purpose of the present invention is to enhance the accuracy of information extraction by detecting and correcting errors resulted from existing NLP technologies.

Another purpose of the present invention is to verify plant procedures for their coherent compliance to the regulated writing guidelines that are aimed to enhance the human performance quality of plant personnel.

Solution to Problem

In a general aspect of the present invention, a system for verification of plant procedures' compliance to writing manuals may include an information extraction module that extracts all significant syntactic and semantic information from procedures; and a compliance verification module that verifies each sentence (or phrase) of procedures whether it conforms to all specific guidelines of a procedure writing manual, utilizing the syntactic and semantic information extracted by the information extraction module, wherein the guidelines of a procedure writing manual are aimed to ensure human performance quality when the instructions described in procedures are performed.

The information extraction module may include the following four units: a preprocessing unit comprising a non-text processing unit that separates out images and tables in input procedure documents; and a text processing unit that extracts structural properties and rich text features for each text paragraph of input procedure documents; an extended natural language processing (NLP) unit that applies existing NLP technology utilizing a public NLP tool for each text paragraph returned from the preprocessing unit and corrects any misinterpreted NLP results; an information extraction unit that identifies all significant syntactic and semantic elements for each text paragraph utilizing preprocessing and extended NLP results; and an output unit that exports all extracted information into various forms, including a database.

The extended NLP unit may include the following three subunits: a first NLP unit for tokenization, sentence splitting, and lemmatization; a second NLP unit for part-of-speech (POS) tagging for each token and hierarchical structuring of tokens for each sentence; and a third NLP unit that detects and corrects any misinterpreted NLP results from the outputs of the second NLP unit, utilizing pattern-based built-in rules integrated with a lexical database.

The information extraction unit may include the following three subunits: a semantic element extraction unit that identifies any significant word(s) of token(s) each to be tagged with one of predefined types utilizing ontology lookup and pattern-based built-in rules; a paragraph type classification unit that identifies each paragraph into one of predefined paragraph types classified into three groups, a first group of 'step' types each containing two components of action verb(s) and target object(s), a second group of types each relatively more relevant to a step type than the types belong to a third group, and a third group of types each relatively less relevant to a step type than the types belong to a second group; and a step component identification unit that detects multiple optional components for each paragraph of a step type, other than two components of action verb(s) and target object(s), utilizing POS tags, semantic element tags, and parse tree tags according to hierarchical structuring of tokens.

The semantic elements identified by the semantic element extraction unit may include plant systems and system components.

The predefined paragraph types could be classified into just two groups, a first group of step types each containing two components of action verb(s) and target object(s) and a second group of other types.

The compliance verification module may include the following three units: a first input unit that retrieves outputs of the information extraction module; a second input unit that retrieves multiple specific procedure writing guidelines; and a compliance verification unit that verifies each sentence (or phrase) in procedures whether it conforms to all specific procedure writing guidelines based on the two types of input.

The compliance verification unit utilizes various types of queries to the database storing all significant syntactic and semantic information extracted from procedures.

The compliance verification unit is performed in two ways for each specific procedure writing guideline either by a batch processing of pre-defined queries or by a stepwise approach that starts with all possibly problematic sentences (or phrases) resulted from comprehensive queries with loose conditions, taking into account of plant-specific discriminatory guidelines and imperfect compliances to the regulated guidelines, and then filters out irrelevant ones with stepwise reinforced query conditions.

When the queries for the verification of procedure writing guidelines are finalized after customized for a specific plant with the stepwise approach, then the compliance verification unit could be performed by a batch processing afterwards.

The compliance verification unit verifies each sentence (or phrase) of procedures whether it conforms to all guidelines of the regulated procedure writing manual, including the writing guidelines related to the following 18 human error traps introduced by the PPA; 'In-field decisions without clear guidance', 'Excessive in-field decisions', 'Decisions without conditional step structure', 'Vague steps or steps missing critical detail', 'Multiple actions in the same step', 'Atypical action steps', 'Negative statements', 'Inadequate defense-in-depth, termination criteria not specified', 'Actions or acceptance criteria in Precautions, Limitations, notes, cautions, and warnings', 'Excessive branching and referencing', 'Inappropriate use of verifications', 'Complex calculations without verification', 'Excessive physical challenges', 'Inconsistent placekeeping methods', 'Time constraints', 'Atypical terms', 'Inconsistent format, layout, and writing style', and 'Non-value added information in Precautions, Prerequisites, notes, cautions, warnings, and steps'.

The compliance verification unit may verify an integrity of plant configuration information by comparing two distinct data sets, semantic elements of plant systems and system components, among the semantic elements identified by the semantic element extraction unit and stored into a database, and a separately managed plant configuration data set that may include an engineering database.

A method for verification of plant procedures' compliance to writing manuals of the present invention may be achieved by performing the following two stages in sequence, an information extraction stage that extracts all significant syntactic and semantic information from procedures; and a compliance verification stage that verifies each sentence (or phrase) of procedures whether it conforms to all guidelines of a regulated procedure writing manual, utilizing the syntactic and semantic information extracted at the information extraction stage.

The information extraction stage may include the following four sub-stages: a first stage that preprocesses document files of the input procedures and extracts structural properties and rich text features for each text paragraph in procedures; a second stage that applies existing NLP technology utilizing a public NLP tool to the text paragraphs returned from the first stage and corrects any misinterpreted NLP results of POS tags and parse trees of tokens; a third stage that identifies all significant semantic elements each to be tagged with one of predefined semantic types, classifies each text paragraph into one of predefined paragraph types, and identifies multiple optional components for each paragraph of a step type; and a fourth stage that exports all the extracted information into various forms, including a database.

To detect and correct the misinterpreted NLP results of POS tags and parse trees of tokens at the second stage, pattern-based built-in rules integrated with a lexical database are utilized.

The semantic element extraction at the third stage may be performed in combined manner, by looking up instances of words included in a predefined ontology each associated with a semantic type and by pattern-based built-in rules described with POS tags, syntactic tags and elements, pre-found semantic tags and elements, and the resulting semantic type. The paragraph type classification at the third stage identifies each paragraph into one of predefined types classified into three groups, a first group of step types each containing two components of action verb(s) and target object(s), a second group of types each relatively more relevant to a step type than the types belong to a third group, and a third group of types each relatively less relevant to a step type than the types belong to a second group. The step component identification at the third stage detects multiple optional components for each paragraph of a step type, other than two components of action verb(s) and target object(s), utilizing POS tags, semantic element tags, and parse tree tags according to hierarchical structuring of tokens.

The paragraph type classification may identify each paragraph into one of predefined types simply classified into two groups, a first group of step types each containing two components of action verb(s) and target object(s) and a second group of other types.

The compliance verification stage provides stepwise drill-down summary analysis results in multiple rows for each procedure writing guideline and specific sentences (or phrases) in procedures corresponding to each row of summary analysis results, utilizing queries to the database storing all the syntactic and semantic information extracted. When a specific sentence (or phrase) is selected from the provided list, the display of a separate word processor screen jumps to and highlights the corresponding text paragraph in the original procedure document, in synchronized manner utilizing the word processor APIs. In this way, the present invention enables to understand the intended purpose of any problematic sentence (or phrase) clearly, by reviewing altogether with surrounding paragraphs directly in the procedure documents, and to improve it correctly to enhance the verification process. Recommendations on how to improve problematic sentences (or phrases) are also provided to enhance the verification process.

The compliance verification stage is performed in two ways for each specific procedure writing guideline either by a batch processing of pre-defined queries or by a stepwise approach that starts with all possibly problematic sentences (or phrases) resulted from comprehensive queries with loose conditions, taking into account of plant-specific discriminatory guidelines and imperfect compliances to the regulated guidelines, and then filters out irrelevant ones with stepwise reinforced query conditions.

When the queries for the verification of procedure wring guidelines are finalized after customized for a specific plant with the stepwise approach, then the compliance verification stage could be performed by a batch processing afterwards.

The compliance verification stage may verify an integrity of plant configuration information by comparing two distinct data sets, semantic elements of plant systems and system components, among the semantic elements identified by the semantic element extraction unit and stored into a database, and a separately managed plant configuration data set that may include an engineering database.

Effects of Invention

According to the present invention, it may be possible to write procedures with consistently adopted terms and writing styles and to enhance the information extraction accuracy by detecting and correcting errors resulted from existing natural language processing technologies.

According to the present invention, by extracting the semantic elements of plant systems and system components contained in procedures, it may be possible to supplement or verify the integrity of the separately managed plant configuration data set that may include an engineering database.

According to the present invention, by systemically providing verification analysis results such as summary analysis results in multiple rows related to a procedure writing guideline, specific procedure sentences (or phrases) corresponding to the selected row of summary analysis result, support for synchronized review of any selected procedure sentences (or phrases) with surrounding paragraphs in a separate word processor window of the procedure document, it may be possible to verify plant procedures for their coherent compliance to the regulated writing guidelines that are aimed to enhance the human performance quality of plant personnel.

According to the present invention, by providing procedures free from human error traps, it may be possible to prevent an incident caused by human error so that an industrial plant can be managed and maintained safely and efficiently.

DESCRIPTION OF DRAWINGS

FIG. 1 is a block diagram of a system for verification of plant procedures' compliance to writing manuals, in accordance with one or more embodiments of the present invention.

BEST MODE FOR IMPLEMENTATION OF THE INVENTION

Figure 2:
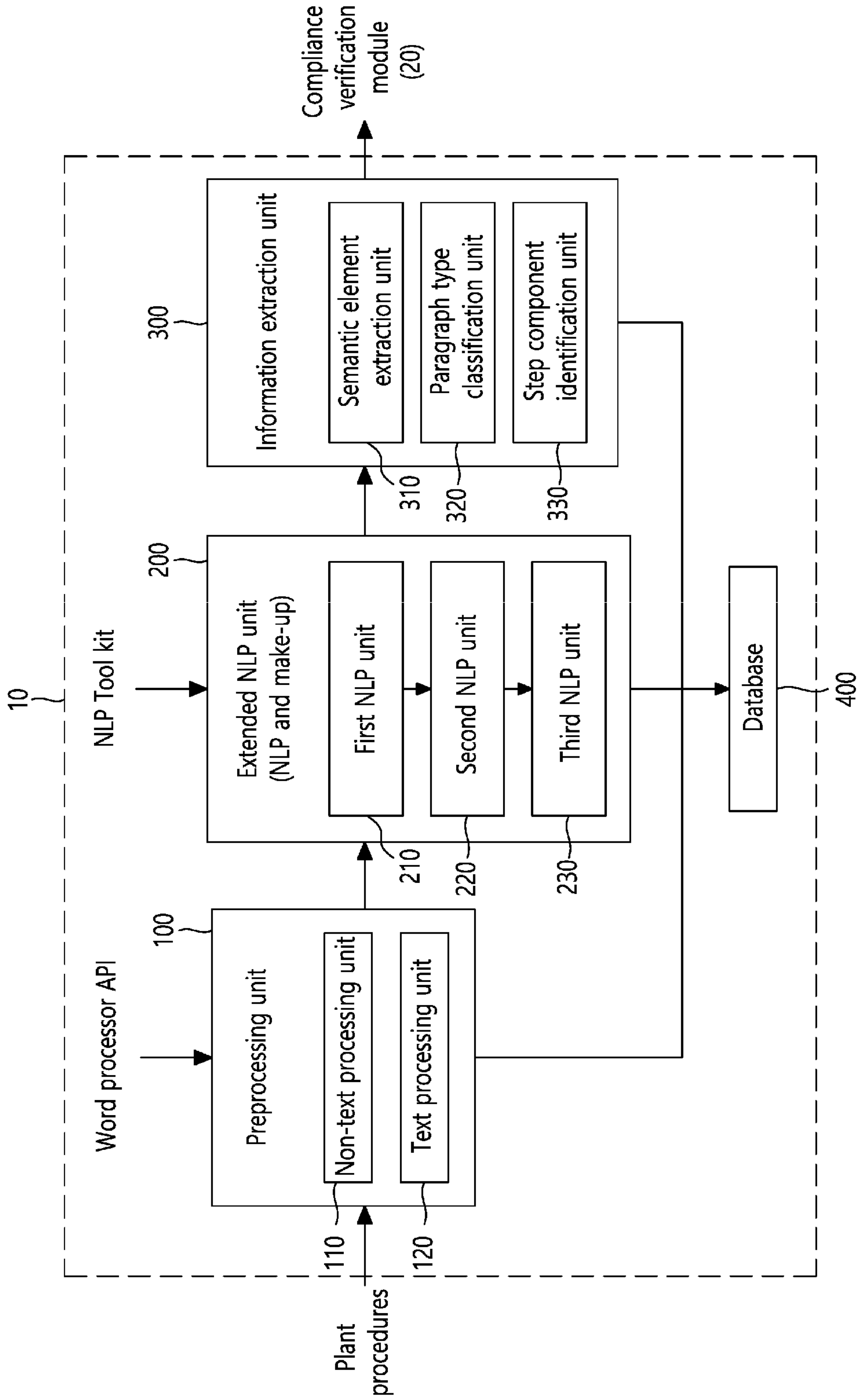
FIG. 2 is a block diagram of the information extraction module shown in FIG. 1.

The advantages and features of the present invention, and the manner of achieving them will be apparent from and elucidated with reference to the embodiments described hereinafter in conjunction with the attached drawings. Hereinafter, a detailed description of known functions and configurations incorporated herein will be omitted when it may make the subject matter of the present invention unclear.

The following terms are defined in consideration of the functions of the present invention, and these may be changed according to the intention of the user or operator.

The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The invention is only defined by the scope of the claims. Therefore, the definition should be based on the contents throughout this specification.

Each plant regulates its own procedure writing manual, possibly after customized or extended from a standard developed by an authorized organization. Thus, each plant-specific procedure writing manual may contain discriminatory guidelines. Moreover, additional variability may exist even for the procedures of a specific plant due to their imperfect compliances to the regulated guidelines. Therefore, a batch processing-based verification approach applied to procedures of a specific plant, utilizing pre-defined rules based on any standard manual, will incur both types of errors, error of omission and error of commission. The present invention aims to verify procedures of any plant on their compliances to any set of writing guidelines in flexible and coherent manner. All significant syntactic and semantic information are extracted from procedures, with NLP technologies employed, and stored into a database. A stepwise compliance verification approach starts with all possibly problematic sentences (or phrases) of procedures resulted from comprehensive queries with loose conditions, for each procedure writing guideline, and then filters out irrelevant ones with stepwise reinforced query conditions. In this way, the present invention improves procedures to be coherently compliant to all regulated writing guidelines to enhance the human performance quality of plant personnel.

Hereinafter, detailed descriptions of the present invention are provided, based on the embodiments associated with drawings.

FIG. 1 is a block diagram of a system for verification of plant procedures' compliance to writing manuals, in accordance with one or more embodiments of the present invention. As shown in FIG. 1, the system of the present invention may be configured to include two modules: an information extraction module 10 that extracts all significant syntactic and semantic information from procedure documents; and a compliance verification module that verifies each sentence (or phrase) of procedures whether it conforms to all specific guidelines of a procedure writing manual, utilizing the syntactic and semantic information extracted by the information extraction module 10.

A block diagram of the information extraction module 10 may include the following units as shown in FIG. 2. As for the units, a preprocessing unit 100 extracts structural properties and rich text features for each text paragraph of input procedure documents utilizing word processor APIs. An extended NLP unit 200 applies NLP technology utilizing a public NLP tool for each text paragraph returned from the preprocessing unit 100 and corrects any misinterpreted NLP results. And an information extraction unit 300 identifies all significant semantic elements each to be tagged with one of predefined semantic types, classifies each paragraph into one of predefined paragraph types, and detects multiple optional components for each paragraph of a step type.

The preprocessing unit 100 may include a non-text processing unit 110 (Non-Text object Handling) and a text processing unit 120 (Create and fill-in text feature for 'Paragraph' instances).

The extended NLP unit 200 applies existing NLP technology utilizing a public NLP tool for each text paragraph returned from the preprocessing unit 100, including when contained in tables, and corrects any misinterpreted NLP results. The extended NLP unit 200 may include the following three subunits: a first NLP unit 210 that performs tokenization, sentence splitting, and lemmatization; a second NLP unit 220 that performs part-of-speech (POS) tagging for each token and hierarchical structuring of tokens for each sentence, utilizing a public NLP tool; and a third NLP unit 230 that detects and corrects any misinterpreted NLP results of the second NLP unit 220, utilizing pattern-based built-in rules integrated with a lexical database. They are performed in the order of the first NLP unit 210, the second NLP unit 220, and the third NLP unit 230. Two types of hierarchical structuring of tokens are provided as parse trees for each sentence of procedures, constituency-based and dependency-based.

The information extraction unit 300 may include the following three subunits: a semantic element extraction unit (SE) 310, a paragraph type classification unit (PC) 320, and a step component identification unit (CI) 330. The semantic element extraction unit (SE) 310 identifies all significant word(s) of token(s), each to be tagged with one of predefined semantic types, utilizing ontology lookup and pattern-based built-in rules. The paragraph type classification unit (PC) 320 classifies each paragraph into one of predefined paragraph types. And, the step component identification unit (CI) 330 detects multiple optional components for each paragraph of a step type, other than two components of action verb(s) and target object(s), utilizing the syntactic and semantic tags (and elements) extracted. After the semantic element extraction unit 310 has been performed, the paragraph type classification unit 320 and the step component identification unit 330 could be performed in any order.

The information extraction module 10 configured to include the above described units extracts all significant syntactic and semantic information from procedures according to the following process of four substages.

At first stage, input procedure documents are preprocessed to extract structural properties and rich text features for each text paragraph, utilizing word processor APIs. At second stage, existing NLP technology is applied utilizing a public NLP tool to the preprocessed text paragraphs, and then any misinterpreted NLP results of POS tags and parse trees are corrected utilizing built-in rules integrated with a lexical database. At third stage, three additional types of information extraction are applied, which are semantic element extraction, paragraph type classification, and step component identification. At fourth stage, all extracted information are exported into multiple forms, including a database, which is called at the end of every other three stages.

Herein, the semantic element extraction at the third stage is performed in combined manner, by looking up instance words in a predefined ontology each associated with a semantic type and by pattern-based built-in rules described with POS tags, syntactic tags and elements, pre-found semantic tags and elements, and the resulting semantic type. The paragraph type classification at the third stage identifies each paragraph into one of predefined types classified into three groups, a first group of 'step' types each containing two components of action verb(s) and target object(s), a second group of types each relatively more relevant to a step type than the types belong to a third group, and a third group of types each relatively less relevant to a step type than the types belong to a second group. The step component identification at the third stage may detect multiple optional components for each paragraph of a step type, other than two components of action verb(s) and target object(s), utilizing POS tags, semantic element tags, and parse tree tags according to hierarchical structuring of tokens.

The present invention, however, may utilize two simple groups of predefined paragraph types. That is, the paragraph type classification may identify each paragraph into one of predefined types simply classified into two groups, the first group of step types each containing two components of action verb(s) and target object(s) and the second group of other types.

The information extraction module 10 may include a database 400 that stores all information extracted from procedures, including the syntactic and semantic elements.

The present invention may include a compliance verification module 20 that verifies each sentence (or phrase) of procedures whether it conforms to all specific guidelines of a procedure writing manual, utilizing the syntactic and semantic information extracted by the information extraction module 10, and provides verification results.

The compliance verification module 20 provides summary analysis results in multiple rows for each procedure writing guideline and specific sentences (or phrases) in procedures corresponding to each row of summary analysis results, utilizing all the syntactic and semantic information extracted by the information extraction module 10. The compliance verification module 20 minimizes both types of errors, one type of error of missing a violated case and the other type of error of misjudging a compliant case as violated. For that purposes, a stepwise drill down analysis method is utilized, starting with all possibly problematic sentences (or phrases) with comprehensive criteria and then filtering out compliant cases with stepwise reinforced criteria. This stepwise verification approach enables to recognize the problematic types found as well as their specific cases, for each procedure writing guideline.

The compliance verification module 20 may be configured to include a first input unit 22 that retrieves all information extracted by the information extraction module 10, a second input unit 24 that retrieves multiple procedure writing guidelines, and a compliance verification unit 26 that verifies each sentence (or phrase) in procedures whether it conforms to all procedure writing guidelines via the stepwise drill-down analysis method, based on the two types of input. The compliance verification module 20 utilizes various forms of queries to the database 400 storing all significant syntactic and semantic elements extracted. Simple and flexible forms of database queries, pre-defined or stepwise customized on demand, to elaborately normalized database tables may provide summary analysis results in multiple rows for each procedure writing guideline and specific sentences (or phrases) in procedures corresponding to each row of summary analysis results.

Herein, the compliance verification unit 26 may be performed in multiple ways including simple and flexible forms of queries to a database storing all syntactic and semantic information extracted. The query-based compliance verification may be performed in two ways for each procedure writing guideline either by a batch processing of pre-defined queries or by a stepwise approach that starts with all possibly problematic sentences (or phrases) resulted from comprehensive queries with loose conditions, taking into account of plant-specific discriminatory guidelines and imperfect compliances to the regulated guidelines, and then filters out irrelevant sentences (or phrases) with stepwise reinforced query conditions. In addition, the compliance verification unit 26 may also verify the integrity of the plant configuration information by comparing two distinct data sets, the separately managed plant configuration data set that may include an engineering database and the semantic elements of plant structures, systems, components, parts, and their hierarchical relationship extracted from procedures by information extraction module 20 and stored into the database 400.

Figure 3:
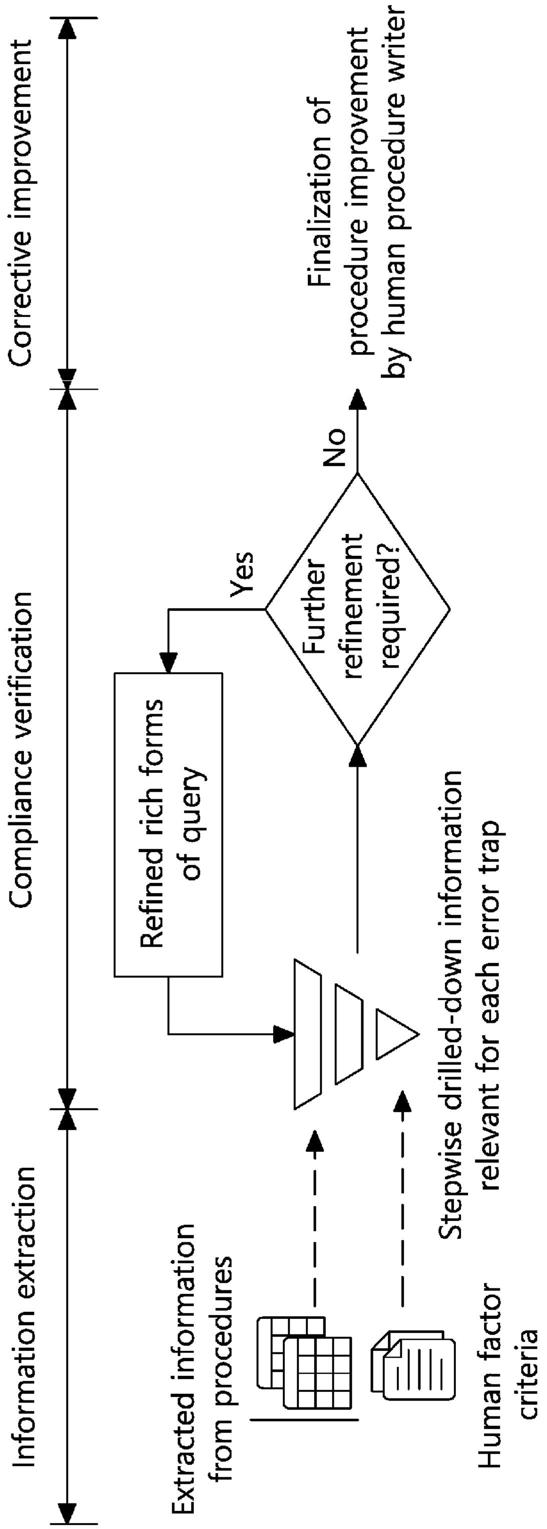
FIG. 3 is a concept diagram of a method to verify plant procedures' compliance to writing manuals by stepwise approach, in accordance with one or more embodiments of the present invention, which includes stages of information extraction and compliance verification.

FIG. 3 is a concept diagram of a method to verify plant procedures' compliance to writing manuals by stepwise approach, in accordance with one or more embodiments of the present invention that includes stages of information extraction and compliance verification.

The method of the present invention may include an information extraction stage in which the information extraction module 10 extracts all significant syntactic and semantic information from procedures; and a compliance verification stage in which the compliance verification unit 20 verifies each sentence (or phrase) of procedures whether it conforms to all procedure writing guidelines, utilizing the syntactic and semantic information extracted at the information extraction stage.

The information extraction stage may include the following four sub-stages: a first stage that preprocesses documents of the input procedures to extract structural properties and rich text features for each text paragraph of procedures; a second stage that applies existing NLP technology utilizing a public NLP tool to the text paragraphs returned from the first stage and corrects any misinterpreted NLP results of POS tags and parse trees of tokens; a third stage that identifies all significant semantic elements each to be tagged with one of predefined semantic types, classifies each text paragraph into one of predefined paragraph types, and identifies multiple optional components for each paragraph of a step type; and a fourth stage that exports all extracted information into various forms, including a database, which is called at the end of every other three stages.

The compliance verification stage may be iteratively performed for all procedure writing guidelines. An embodiment below provides descriptions of procedure writing guidelines related to the 18 human error traps, introduced by the PPA. The compliance verification stage may be repeatedly conducted until all 18 human error traps are verified.

The present invention may additionally include a corrective improvement stage that a procedure writer finally reviews the verification analysis results together with recommendations on how to improve and correct sentences (or phrases) of procedures violating any procedure writing guideline.

The embodiments of the present invention are to verify NPP procedures utilizing writing guidelines related to 18 human error traps, as shown in Table 1, introduced by the PPA (Procedure Professionals Association). However, it is apparent that this embodiment may be extended to additional writing guidelines for procedures of any other industrial plants.

TABLE 1

| | Error trap | Description |
|---|---|---|
| 1 | In-field decisions without clear guidance | Terms such as IF necessary and IF applicable shift the worker to the knowledge-based performance mode and a higher error rate. Instead, provide sufficient detail to support consistently good decisions. |
| 2 | Excessive in-field decisions | Too many well-written decisions can fatigue and confuse the worker, resulting in error. This is usually the result of too much job scope or poor document design. |
| 3 | Decisions without conditional step structure | Atypical or inconsistently written conditional steps can inhibit proper decision making. Always use a conditional structure (e.g., IF . . . THEN, WHEN . . . THEN) when making a decision. |
| 4 | Vague steps or steps missing critical detail | Vague steps or inadequate detail can put the worker in knowledge-based performance mode with its corresponding high error rate. Overall, the level of detail should be suitable for an inexperienced, qualified user with no direct supervision. This includes the necessary detail to successfully implement steps that are contrary to normal convention (e.g., left-handed threads). |

TABLE 1-continued

| | Error trap | Description |
|---|---|---|
| 5 | Multiple actions in the same step | Including more than one action in the same step increases the probability that the worker will miss the additional action(s). Steps with one action verb and two objects affecting configuration are also an error trap. However, two actions in one step are acceptable if they are functionally related and HAVE to be performed simultaneously to obtain a single result. Unrelated actions are never acceptable. |
| 6 | Atypical action steps | Action steps not written as short active voice imperative sentences can be difficult to understand and consistently implement. The use of passive voice is especially problematic. |
| 7 | Negative statements | Negative statements in action steps and conditional logic can be difficult to understand and implement. Double negatives are especially problematic. Also, they can result in knowledge-based errors when a worker attempts to determine the possible positive responses. Whenever possible, use positive statements. |
| 8 | Inadequate defense-in-depth, termination criteria not specified | Ensure risk is understood and appropriate defenses are established. Plan for both success and possible failure-what if the desired results are not obtained? |
| 9 | Actions acceptance criteria in Precautions, Limitations, notes, cautions, and warnings | Embedding actions or acceptance criteria in content not normally having this information increases the probability of actions being missed. Precautions, Limitations, notes, cautions, and warnings NEVER have actions, explicit or implicit. |
| 10 | Excessive branching and referencing | Branching and referencing is an administrative burden for the worker that might lead to error if used excessively. |
| 11 | Inappropriate use of verifications | Low value verifications can dilute the meaning and importance of the more important ones. There should be a regulatory, risk, or performance based reason for every verification. |
| 12 | Complex calculations without verification | Experience has shown that complex calculations should be separately verified by a second person so that any errors are caught before they affect the asset. |
| 13 | Excessive physical challenges | The selected components or sequence of steps may not be the most convenient or practical for the worker. What looks good on a diagram or at a desk may not look so appealing at the job site. Use validation to flesh out any issues. |
| 14 | Inconsistent placekeeping methods | A consistently applied placekeeping standard should be used for both Continuous Use and Reference Use documents. In turn, design each document to support this standard, including the choice to use initial blanks or checkboxes. |
| 15 | Time constraints | Avoid any words that could unnecessarily cause perceived time pressure. If time is of the essence (e.g., regulatory limit, time critical operator action), clearly communicate both the reason for the time constraint and the method for meeting it. Use validation to ensure that the time limit can easily be met. |
| 16 | Atypical terms | Using slang, uncommon words, or two different words to mean the same thing can make the document harder to understand, which can lead to error. Consistency in writing and terminology is key to success. |
| 17 | Inconsistent format, layout, and writing style | Inconsistent format, layout, or writing style is a user and writer burden and a precursor for error. In particular, a proper and consistent use of attributes such as fonts, emphasis, step numbering, association, abbreviations, acronyms, numbers, and action verbs have been proven to reduce error. |
| 18 | Non-value added information in Precautions, Prerequisites, notes, cautions, warnings, and steps | The cumulative effect of including boiler plate and redundant technical and administrative information in a document results in what is called bloat. Workers tend to just skim this information and can miss important task- specific details. A better, more sustainable solution is to use worker pre-job checklists. |

According to the method of the present invention, all significant syntactic and semantic information are extracted from procedure documents at the information extraction stage, and each sentence (or phrase) of procedures is verified whether it conforms to all specific guidelines of a procedure writing manual, including the writing guidelines related 18 human error traps of Table 1, at the compliance verification stage. All summary analysis reports, specific sentences (or phrases) of procedures violating any of procedure writing guidelines, and recommendations on how to improve are provided to procedures writers for the corrective improvement of procedures in coherent manner. Therefore, the present invention may provide procedures free from human error traps to fundamentally prevent an incident incurred from a human error, for a safe and efficient operation of industrial plants.

Method for Carrying Out the Invention

Examples of stepwise verification results for human errors traps will be described. The examples are selected results of the embodiments of the present invention applied to twenty-five procedures obtained from a U.S. commercial NPP in two groups: ten operating procedures (OPs) and fifteen testing procedures (TPs). The effectiveness of the present invention will be described with query-based summary analysis results for selected human error traps.

Table 2 shows seventeen paragraph types classified in two groups and the incidence counts of each paragraph type for total 15,414 paragraphs belonging to the section of instructions and the section of precautions and limitations, found from the twenty-five procedures that the embodiments of the present invention applied.

TABLE 2

| | | Instructions | | Precautions & Limitations | |
|---|---|---|---|---|---|
| | Paragraph type | Count | % | Count | % |
| Step | Action step (AS) | 5.753 | 38.26 | 9 | 2.37 |
| | Branching step (BS) | 2 | 0.01 | 0 | — |
| | Referencing step (RS) | 34 | 0.23 | 1 | 0.26 |
| | Conditional action step (CndAS) | 1.334 | 8.87 | 2 | 0.53 |
| | Continuous action step (CntAS) | 101 | 0.67 | 0 | — |
| | Subtotal | 7.224 | 48.05 | 12 | 3.17 |
| Others | NCW header | 1.004 | 6.68 | 20 | 5.28 |
| | NCW statement | 1.034 | 6.88 | 20 | 5.28 |
| | Hold Point | 0 | — | 0 | — |
| | Record row | 170 | 1.13 | 0 | — |
| | Calculation row | 6 | 0.04 | 0 | — |
| | Signoff row | 215 | 1.43 | 0 | — |
| | List element | 4.299 | 28.59 | 72 | 19.00 |
| | Logical operator | 87 | 0.58 | 2 | 0.53 |
| | Title of a (sub)section | 573 | 3.81 | 40 | 10.55 |
| | FIGURE/Table caption | 0 | — | 0 | — |
| | Continuation heading | 153 | 1.02 | 0 | 1 |
| | Information | 270 | 1.80 | 213 | 56.20 |
| | Subtotal | 7.811 | 51.95 | 367 | 96.83 |
| | Total | 15.035 | 100.00 | 379 | 100.00 |

Table 3 illustrates an example summary analysis result of the compliance verification module 20 in verifying the first human error trap of 'In-field decisions without clear guidance', for those paragraphs found from 25 procedures as shown in Table 2. According to Table 1, examples of 'In-field decisions without clear guidance' include 'if necessary' or 'if applicable'. Additional types were found, but specific examples are omitted.

TABLE 3

| Step | OPs | | | | | TPs | | | | |
|---|---|---|---|---|---|---|---|---|---|---|
| type | Cnd | CI | Adv | SI | Sum | Cnd | CI | Adv | SI | Sum |
| AS | — | — | — | 19 | 19 | — | 5 | — | 2 | 7 |
| CndAS | 47 | — | — | 4 | 51 | 18 | — | — | — | 18 |
| Total | 47 | — | — | 23 | 70 | 18 | 5 | — | 2 | 25 |

(Cnd: condition, CI: critical information. Adv; adverb. SI: supporting information)

Table 3 shows the incidence counts of step components containing any phrase corresponding to 'In-field decisions without clear guidance'. According to Table 3, phrases of 'In-field decisions without clear guidance' were identified from 95 paragraphs belonging to the step group, 70 for OPs and 25 for TPs. Phrases of 'In-field decisions without clear guidance' could be interpreted differently by operators, which may cause a human error. Thus, it is recommended to revise those phrases to provide sufficient details for consistently good decisions. Table 3 also enables partial examination of an additional human error trap, the third one of 'Decisions without conditional step structure', which requires any decision for a step should be described in a condition component. A total of 30 paragraphs, 23 for OPs and 7 for TPs, did not meet that requirement.

Table 4 and Table 5 show examples of summary analysis results in verifying the second human error trap of 'Excessive in-field decisions'.

As shown in Table 2, many paragraphs of the Conditional action step (CndAS) or Continuous action step (CntAS) types were found, 1,334 and 101 each respectively, in the instructions section. Those 1,435 paragraphs in the instructions section represent 19.9% of the total 7,224 paragraphs belonging to the 'Step' group, which is not a small number. Table 4 shows more specific types of the paragraphs discriminated by their starting word(s) as percentages of the total number of paragraphs belonging to the step group, additionally classified into two procedure types of OPs and TPs. Their total incidence counts and percentages were 1,198 (22.85% of 5,244) for OPs and 237 (11.97% of 1,980) for TPs, which is a relatively high frequency.

Table 5 illustrates another summary analysis result for the paragraphs of Table 4, the incidence counts of paragraphs of the CndAS and CntAS types classified by their depths, where depth is the number of ancestor paragraphs of the CndAS or CntAS types embedded with the current one. A paragraph of the CndAS or CntAS type of depth of one or more requires precise recognition and memory of the worker and increases the likelihood of human error. A total of 258 paragraphs were of depth one or more of CndAS (240, 17.99%) or CntAS (18, 17.82%) types. Such results might be due to the types of analyzed procedures (OPs and TPs), however, more intuitive descriptions are recommended for the paragraphs containing 'Excessive in-field decisions'.

TABLE 4

| Paragraph | Starting | OPs | | TPs | |
|---|---|---|---|---|---|
| type | with | Count | % | Count | % |
| CndAS | If | 822 | 15.68 | 189 | 9.55 |
| | When | 281 | 5.36 | 42 | 2.12 |
| CntAS | While | 95 | 1.81 | 6 | 0.30 |
| | If at any time | 0 | — | 0 | — |
| | Total | 1.198 | 22.85 | 237 | 11.97 |

TABLE 5

| Paragraph type | Depth | OPs Count | OPs % | TPs Count | TPs % | All Count | All % |
|---|---|---|---|---|---|---|---|
| CndAS | 0 | 885 | 80.24 | 209 | 90.48 | 1,094 | 82.01 |
| | 1 | 194 | 17.59 | 22 | 9.52 | 216 | 16.19 |
| | 2 | 23 | 2.09 | — | — | 23 | 1.72 |
| | 3 | 1 | 0.09 | — | — | 1 | 0.07 |
| | Subtotal | 1,103 | 100.00 | 231 | 100.00 | 1,334 | 100.00 |
| CntAS | 0 | 79 | 83.16 | 4 | 66.67 | 83 | 82.18 |
| | 1 | 12 | 12.63 | 2 | 33.33 | 14 | 13.86 |
| | 2 | 4 | 4.21 | — | — | 4 | 3.96 |
| | Subtotal | 95 | 100.00 | 6 | 100.00 | 101 | 100.00 |

Table 6 illustrates an example summary analysis result in verifying the fifth human error trap of 'Multiple actions in the same step'. Including more than one action in the same step increases a probability that the worker will miss the additional action(s). Steps with one action verb and two objects affecting configuration are also an error trap. However, two actions in one step are acceptable if they are functionally related and have to be performed simultaneously to obtain a single result. Accordingly, for 617 paragraphs (8.5% of 7,224) except for the Type 1 and Type 4, more specifically, for 387 OP paragraphs (7.4% of 5,224) and 230 TP paragraphs (11.6% of 1,980), it may be advised to list multiple target objects in bullet form below the step or to split them into multiple step statements.

TABLE 6

| Classification of core components | OPS Count | OPS % | TPS Count | TPS 0 |
|---|---|---|---|---|
| 1 Single AV + single TO | 4.767 | 90.90 | 1.678 | 84.75 |
| 2 Single AV + two TOs | 136 | 2.59 | 84 | 4.24 |
| 3 Single AV + more than two TOs | — | — | 1 | 0.05 |
| 4 Two-related AVs + single TO | 90 | 1.72 | 72 | 3.64 |
| 5 Two-related AVs + two TOs | — | — | 33 | 1.67 |
| 6 Two-related AVs + more than two TOs | — | — | — | — |

TABLE 6-continued

| Classification of core components | OPS Count | OPS % | TPS Count | TPS 0 |
|---|---|---|---|---|
| 7 Multiple occurrences of the above types in a single sentence | 210 | 4.00 | 83 | 4.19 |
| 8 Multiple sentences including at least one of the above types | 41 | 0.78 | 29 | 1.46 |
| Total | 5.244 | 100.00 | 1.980 | 100.00 |

(AV: action verb. TO: target object)

Table 7 and Table 8 illustrate examples of summary analysis results in verifying the eleventh human error trap of 'Inappropriate use of verification'. Table 7 shows the types of signoff rows and their incidence counts in TPs. The only signoff row found in OPs, similar to type (i), is not shown in Table 7. Further analyses were focused on the five types of signoff rows found in TPs. Table 8 shows an additional analysis result to verify whether signoff rows were employed in consistent manner.

TABLE 7

| | Signoff type | | Count |
|---|---|---|---|
| (i) | ____________ | _______<br>Date/Time | 15 |
| (ii) | ____________<br><Role> | _______<br>Date/Time | 26 |
| (iii) | Performed by | ________/___<br>Signature/Date | 86 |
| (iv) | Independent Verification | ________/___<br>Signature/Date | 25 |
| (v) | Concurrent Verification | ________/___<br>Signature/Date | 62 |
| | Total | | 214 |

TABLE 8

| Paragraph prior to signoff rows (a): Type | Action verb or verb phrase (b) | Count (c) | Type(s) of signoff row(s) following (a): (i) | (ii) | (iii) | (iv) | (v) | Sum | Total no. of para. with (b) (d) | c/d (%) | Count of distinct target objects of (b) |
|---|---|---|---|---|---|---|---|---|---|---|---|
| Step | ('Independently') + verify | 13 | — | — | 1 | 12 | — | 13 | 522 | 2.5 | 4 |
| | Update | 8 | — | 8 | — | — | — | 8 | 8 | 100.0 | 1 |
| | Connect | 12 | — | — | 12 | — | 10 | 22 | 32 | 68.8 | 3 |
| | Disconnect | 6 | — | — | 6 | — | 4 | 10 | 15 | 66.7 | 2 |
| | Install | 3 | — | — | 3 | — | — | 3 | 30 | 10.0 | 1 |

TABLE 8-continued

| Paragraph prior to signoff rows (a) | | | Type(s) of signoff row(s) following (a) | | | | | | Total no. of para. | | Count of |
|---|---|---|---|---|---|---|---|---|---|---|---|
| Type | Action verb or verb phrase (b) | Count (c) | (i) | (ii) | (iii) | (iv) | (v) | Sum | with (b) (d) | c/d (%) | distinct target objects of (b) |
| | Remove | 15 | — | — | 15 | 12 | — | 27 | 41 | 65.9 | 3 |
| | Sign and record | 33 | 15 | 18 | — | — | — | 33 | 33 | 100.0 | 1 |
| | Remove A and reinstall B | 1 | — | — | 1 | — | — | 1 | — | — | 2 |
| | Subtotal | 91 | 15 | 26 | 38 | 24 | 14 | 117 | 681 | — | — |
| Others | 'I&C' + install | 24 | — | — | 24 | — | 24 | 48 | — | — | — |
| | 'I&C' + remove | 24 | — | — | 24 | — | 24 | 48 | — | — | — |
| | 'Verify' in passive voice | 1 | — | — | — | 1 | — | 1 | — | — | — |
| | Subtotal | 49 | 0 | 0 | 48 | 1 | 48 | 97 | — | — | — |
| | Total | 140 | 15 | 26 | 86 | 25 | 62 | 214 | 681 | — | — |

According to Table 7 and Table 8, a total of 140 paragraphs, 91 belonging to the step group and 49 of 'others' group, were followed by 214 signoff rows. That is, many of those paragraphs were followed by multiple signoff rows. The rest of the columns of Table 8 show the frequencies of each action verb or verb phrase used in the paragraphs preceding to signoff rows and the frequencies for each type of signoff rows following, which are additionally analyzed results to determine whether signoff rows are used in consistent manner. It is shown that there exist certain patterns in the utilization of signoff rows.

The present invention can verify for all procedure writing guidelines, including the writing guidelines related to 18 human error traps, in similar manner to the above-described embodiment of the compliance verification module. Sentences (or phrases) violating any of procedure writing guidelines could be improved by the procedure writer referring the recommendations provided by the compliance verification module.

As stated above, the present invention enables to develop and maintain plant procedures compliant to all procedure writing guidelines, by following the stages of information extraction, compliance verification, and corrective improvement. As a result, the present invention improves procedures to be free from human error traps to fundamentally prevent an incident incurred from a human error, for a safe and efficient operation of industrial plants.

Figure 4A:
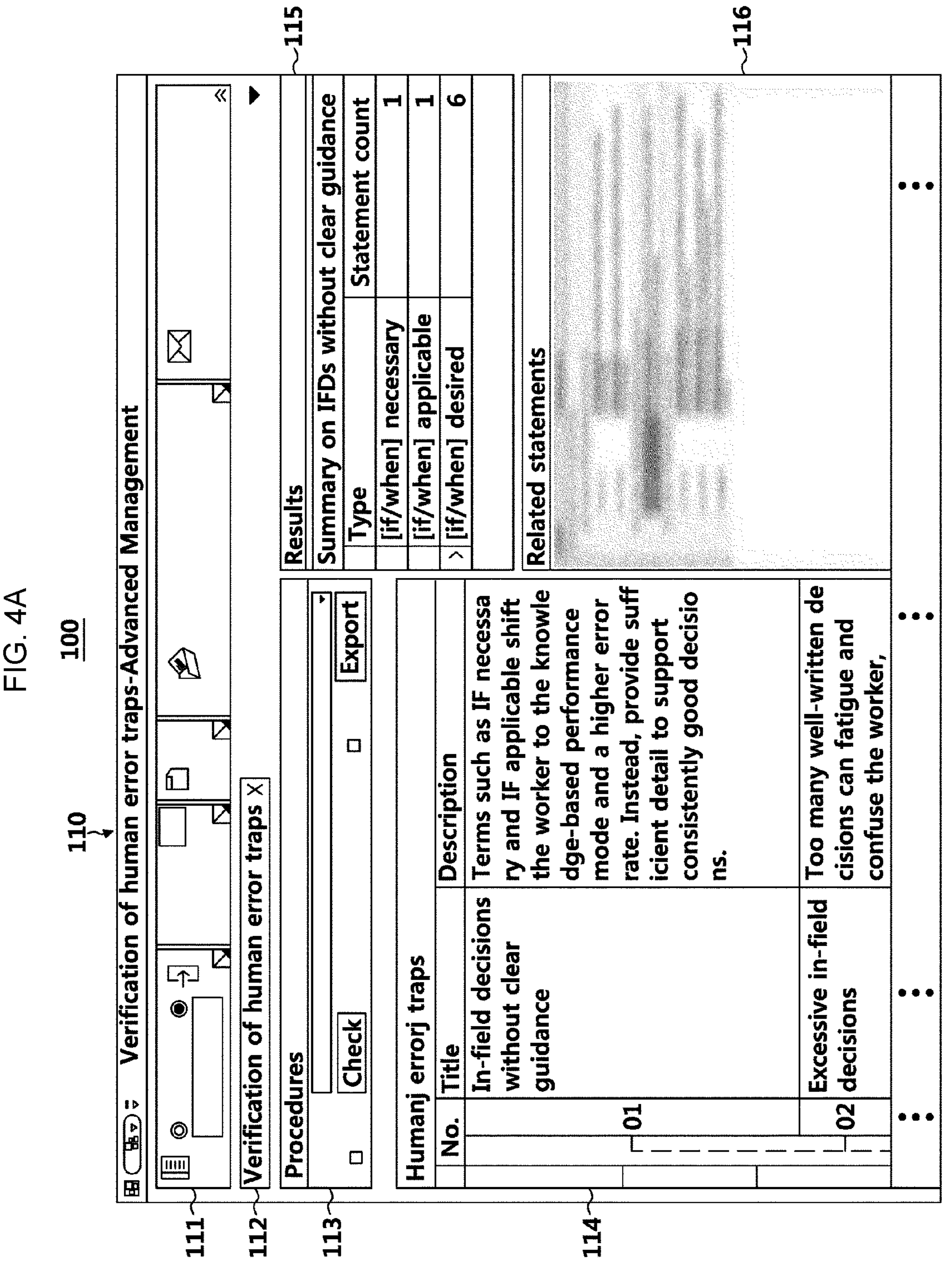
FIG. 4 illustrates example screens provided by the compliance verification module, in accordance with one or more embodiments of the present invention.
Figure 4B:
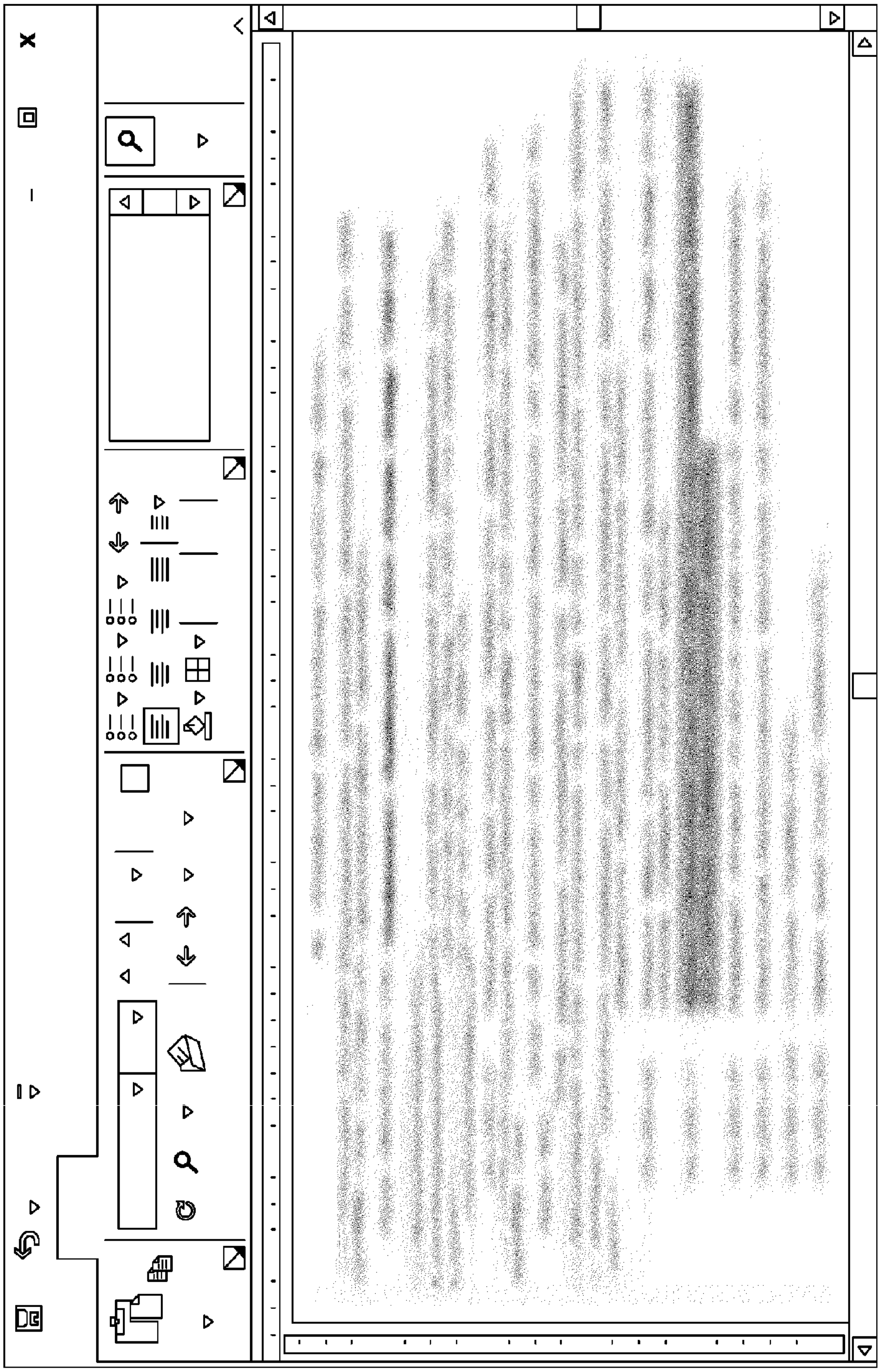

FIGS. 4A and 4B illustrate example screens provided by the compliance verification module, in accordance with one or more embodiments of the present invention. Although they are shown separately in the drawings, FIGS. 4A and 4B are actually provided together in synchronized manner, with the first screen 110 and the second screen 120.

An example output screen 100 of the compliance verification module, shown in FIG. 4, may be divided into a first screen 110 and a second screen 120. The first screen 110 may include a menu display unit 111 for menu selection, a status display unit 112 to inform current status, a target procedure selection unit 113 for the selection of plant procedures to verify, a first region 114 that shows descriptions of procedure writing guidelines, a second region 115 that shows a summary analysis result in multiple rows related to a procedure writing guideline selected in the first region 114, and a third region 116 that shows specific procedure sentences (or phrases) corresponding to the row of summary analysis result selected from the second region 115. In the rightmost column of the first region 114, a symbolic mark is displayed to indicate the occurrence of violating cases for each writing guideline, based on the verification results. To preserve the confidentiality of facility-specific information, the third region 116 and the second screen 120 have been blurred.

The second screen 120 is for a separate word processor software that loads and shows the original procedure documents, synchronized with the first screen 110. When a specific sentence (or phrase) is selected in the third region 116, the display of the second screen 120 jumps to and highlights the corresponding text paragraph in the original procedure document, utilizing the word processor APIs.

As described above, the present invention provides screens to review the selected sentence (or phrase) altogether with surrounding paragraphs directly in the procedure documents. In this way, the present invention enables to understand the intended purpose of any problematic sentence (or phrase) clearly and to improve it correctly to enhance the verification process.

As described above, the present invention extracts all significant syntactic and semantic information from procedures and verifies each sentence (or phrase) in procedures whether it conforms to all guidelines of the regulated procedure writing manual, utilizing the extracted information.

In accordance with one or more embodiments of the present invention, a method can be included as a program command performed through various computer means and recorded in a computer reading medium. The computer reading medium may include a program command, data file, data structure, etc., ora combination of them. The program command recorded in the medium can be designed and configured specifically for the present invention, or it can be set up to notify an operator of computer software as a usable command. Examples of the computer reading medium may include magnetic media such as a hard drive or magnetic disk, an optical medium such as CD-ROM and DVD, a magneto-optical media such as a floptical disk, and a hardware device such as ROM, RAM, and flash memory that is specifically configured to save and perform a program command. Examples of the program command may include not only a machine language code made by a compiler, but also a high-level language code that may be executed by a computer using an interpreter, etc. These hardware devices may be configured so as to be operated as one or more software modules to perform an operation in the present invention; a reversed situation may also be possible.

The above-described exemplary embodiments are examples from the present invention, but the present invention is not limited to those aspects only. The present invention can be customized in various forms by those skilled in the art so that the technical scope of the present invention should be defined by the following claims.

INDUSTRIAL APPLICABILITY

The disclosure may be applied to develop various plant procedures and maintenance for industrial fields operating many facilities, such as a power plant, an oil refinery, a (petro) chemical plant, a desalination plant, etc.

The invention claimed is:

1. A system for verification of plant procedures' compliance to writing manuals, comprising:

a preprocessing unit including a non-text processing unit that separates out images and tables in input procedure documents; and a text processing unit that extracts structural properties and rich text features for each text paragraph of the input procedure documents with images and tables separated;

an extended natural language processing (NLP) unit that applies existing NLP technology utilizing a public NLP tool for each text paragraph returned from the preprocessing unit and corrects any misinterpreted NLP results;

an information extraction unit that identifies all syntactic and semantic information for each text paragraph utilizing preprocessing and extended NLP results;

a first input unit that retrieves outputs of the information extraction unit;

a second input unit that retrieves multiple specific procedure writing guidelines;

a compliance verification unit that verifies each sentence (or phrase) of procedures whether it conforms to all specific guidelines of a procedure writing manual, based on the inputs retrieved by the first input unit and the second input unit, wherein the guidelines of a procedure writing manual are aimed to ensure human performance quality when instructions described in the plant procedures are performed; and wherein the compliance verification unit is configured to: provide stepwise drill-down summary analysis results in multiple rows for each procedure writing guideline and specific sentences (or phrases) in the plant procedures corresponding to each row of summary analysis results, utilizing queries to the database storing all the syntactic and semantic information extracted; correspondingly synchronize the highlighted selection of the text paragraph of the original procedure document in a separate word processor screen, utilizing the word processor APIs, when a specific sentence (or phrase) is selected from the provided list, to enable clear understanding of the intended purpose and correct improvement for any problematic sentence (or phrase) being reviewed altogether with the surrounding paragraphs directly in the procedure document; and additionally provide recommendations on how to improve problematic sentences (or phrases) to enhance the verification process.

2. The system for verification of plant procedures' compliance to writing manuals of claim 1, further comprising an output unit that exports all the syntactic and semantic information extracted by the information extraction unit into various forms, including a database.

3. The system for verification of plant procedures' compliance to writing manuals of claim 1, wherein the extended NLP unit comprises the following three sub-units:

a first NLP unit for tokenization, sentence splitting, and lemmatization;

a second NLP unit for part-of-speech (POS) tagging for each token and hierarchical structuring of tokens for each sentence; and a third NLP unit that detects and corrects any misinterpreted NLP results from the outputs of the second NLP unit, utilizing pattern-based built-in rules integrated with a lexical database.

4. The system for verification of plant procedures' compliance to writing manuals of claim 1, wherein the information extraction unit comprises the following three sub-units:

a semantic element extraction unit that identifies any significant word(s) of token(s) each to be tagged with one of predefined types utilizing ontology lookup and pattern-based built-in rules;

a paragraph type classification unit that identifies each paragraph into one of predefined paragraph types classified into three groups, a first group of 'step' types each containing two components of action verb(s) and target object(s), a second group of types each relatively more relevant to a step type than the types belong to a third group, and a third group of types each relatively less relevant to a step type than the types belong to a second group; and a step component identification unit that detects multiple optional components for each paragraph of a step type, other than two components of action verb(s) and target object(s), utilizing POS tags, semantic element tags, and parse tree tags according to hierarchical structuring of tokens.

5. The system for verification of plant procedures' compliance to writing manuals of claim 4, wherein the predefined paragraph types are classified into just two groups, a first group of step types each containing two components of action verb(s) and target object(s) and a second group of other types.

6. The system for verification of plant procedures' compliance to writing manuals of claim 4, wherein the semantic elements identified by the semantic element extraction unit include plant systems and system components.

7. The system for verification of plant procedures' compliance to writing manuals of claim 4, wherein the compliance verification unit verifies an integrity of plant configuration information by comparing two distinct data sets, semantic elements of plant systems and system components, among the semantic elements identified by the semantic element extraction unit and stored into a database, and a separately managed plant configuration data set that includes an engineering database.

8. The system for verification of plant procedures' compliance to writing manuals of claim 1, wherein the compliance verification unit utilizes various types of queries to the database storing all significant syntactic and semantic information extracted from the plant procedures.

9. The system for verification of plant procedures' compliance to writing manuals of claim 1, wherein the compliance verification unit is performed in two ways for each specific procedure writing guideline either by a batch processing of pre-defined queries or by a stepwise approach that starts with all possibly problematic sentences (or phrases) resulted from comprehensive queries with loose conditions, taking into account of plant-specific discriminatory guidelines and imperfect compliances to the regulated guidelines, and then filters out irrelevant ones with stepwise reinforced query conditions.

10. The system for verification of plant procedures' compliance to writing manuals of claim 9, wherein the compliance verification unit is performed by a batch processing when the queries for the verification of procedure writing guidelines are finalized after customized for a specific plant with the stepwise approach.

11. The system for verification of plant procedures' compliance to writing manuals of claim 1, wherein the compliance verification unit verifies each sentence (or phrase) of the plant procedures whether it conforms to all guidelines of the regulated procedure writing manual, including the writing guidelines related to the following 18 human error traps introduced by the Procedure Professionals Association (PPA): 'In-field decisions without clear guidance', 'Excessive in-field decisions', 'Decisions without conditional step structure', 'Vague steps or steps missing critical detail', 'Multiple actions in the same step', 'Atypical action steps', 'Negative statements', 'Inadequate defense-in-depth, termination criteria not specified', 'Actions or acceptance criteria in Precautions, Limitations, notes, cautions, and warnings', 'Excessive branching and referencing', 'Inappropriate use of verifications', 'Complex calculations without verification', 'Excessive physical challenges', 'Inconsistent placekeeping methods', 'Time constraints', 'Atypical terms', 'Inconsistent format, layout, and writing style', and 'Non-value added information in Precautions, Prerequisites, notes, cautions, warnings, and steps'.

12. A method for verification of plant procedures' compliance to writing manuals, comprising, sequentially:

a first stage that preprocesses document files of the input procedures and extracts structural properties and rich text features for each text paragraph in the plant procedures;

a second stage that applies existing NLP technology utilizing a public NLP tool to the text paragraphs returned from the first stage and corrects any misinterpreted NLP results of POS tags and parse trees of tokens;

a third stage that identifies all semantic elements each to be tagged with one of predefined semantic types, classifies each text paragraph into one of predefined paragraph types, and identifies multiple optional components for each paragraph of a step type to extract the syntactic and semantic information in the input procedure documents; and a fourth stage that verifies each sentence (or phrase) of the plant procedures whether it conforms to all guidelines of a procedure writing manual, utilizing the syntactic and semantic information extracted at the third stage wherein the fourth stage comprises: providing stepwise drill-down summary analysis results in multiple rows for each procedure writing guideline and specific sentences (or phrases) in the plant procedures corresponding to each row of summary analysis results, utilizing queries to the database storing all the syntactic and semantic information extracted; correspondingly synchronizing the highlighted selection of the text paragraph of the original procedure document in a separate word processor screen, utilizing the word processor APIs, when a specific sentence (or phrase) is selected from the provided list, to enable clear understanding of the intended purpose and correct improvement for any problematic sentence (or phrase) being reviewed altogether with the surrounding paragraphs directly in the procedure document; and additionally providing recommendations on how to improve problematic sentences (or phrases) to enhance the verification process.

13. The method for verification of plant procedures' compliance to writing manuals of claim 12, further comprising:

a sub-stage 3-1 that outputs the syntactic and semantic information extracted in the third stage into two or more forms of outputs, including a database.

14. The method for verification of plant procedures' compliance to writing manuals of claim 12, wherein pattern-based built-in rules integrated with a lexical database are utilized, to detect and correct the misinterpreted NLP results of POS tags and parse trees of tokens at the second stage.

15. The method for verification of plant procedures' compliance to writing manuals of claim 12, wherein the semantic element extraction at the third stage is performed in combined manner, by looking up instances of words included in a predefined ontology each associated with a semantic type and by pattern-based built-in rules described with POS tags, syntactic tags and elements, pre-found semantic tags and elements, and the resulting semantic type, the paragraph type classification at the third stage identifies each paragraph into one of predefined types classified into three groups, a first group of step types each containing two components of action verb(s) and target object(s), a second group of types each relatively more relevant to a step type than the types belong to a third group, and a third group of types each relatively less relevant to a step type than the types belong to a second group, and a step component identification at the third stage detects multiple optional components for each paragraph of a step type, other than two components of action verb(s) and target object(s), utilizing POS tags, semantic element tags, and parse tree tags according to hierarchical structuring of tokens.

16. The method for verification of plant procedures' compliance to writing manuals of claim 15, wherein the paragraph type classification identifies each paragraph into one of predefined types simply classified into two groups, a first group of step types each containing two components of action verb(s) and target object(s) and a second group of other types.

17. The method for verification of plant procedures' compliance to writing manuals of claim 12, wherein the fourth stage is performed in two ways for each specific procedure writing guideline either by a batch processing of pre-defined queries or by a stepwise approach that starts with all possibly problematic sentences (or phrases) resulted from comprehensive queries with loose conditions, taking into account of plant-specific discriminatory guidelines and imperfect compliances to the regulated guidelines, and then filters out irrelevant ones with stepwise reinforced query conditions.

18. The method for verification of plant procedures' compliance to writing manuals of claim 17, wherein the fourth stage is performed by a batch processing, when the queries for the verification of procedure writing guidelines are finalized after customized for a specific plant with the stepwise approach.

19. The method for verification of plant procedures' compliance to writing manuals of claim 17, wherein the fourth stage verifies an integrity of plant configuration information by comparing two distinct data sets, semantic elements of plant systems and system components, among the semantic elements identified by the semantic element extraction unit and stored into a database, and a separately managed plant configuration data set that includes an engineering database.

* * * * *